(12) United States Patent  
Hosokawa et al.

(10) Patent No.: US 8,399,804 B2  
(45) Date of Patent: Mar. 19, 2013

(54) METHOD FOR MANUFACTURING PRISMATIC BATTERY, AND LASER WELDING JIG AND LASER WELDING DEVICE FOR MANUFACTURING THE SAME

(75) Inventors: Hiroshi Hosokawa, Itano-gun (JP); Haruhiko Yamamoto, Itano-gun (JP); Masato Nishikawa, Kumagaya (JP); Takahiro Nakamura, Kumagaya (JP); Hitoshi Kihara, Hirakata (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 784 days.

(21) Appl. No.: 12/567,925

(22) Filed: Sep. 28, 2009

(65) Prior Publication Data

US 2010/0078413 A1    Apr. 1, 2010

(30) Foreign Application Priority Data

Sep. 30, 2008  (JP) ................. 2008-254784  
Mar. 30, 2009  (JP) ................. 2009-083551

(51) Int. Cl.  
*B23K 9/16*  (2006.01)
(52) U.S. Cl. ............. 219/137.42; 219/74; 219/121.64
(58) Field of Classification Search ............ None  
See application file for complete search history.

(56) References Cited

U.S. PATENT DOCUMENTS 6,214,116 B1 *  4/2001  Shin ........................ 118/640

FOREIGN PATENT DOCUMENTS

| JP | 05208285 A | * | 8/1993 |
| JP | 06-292989 A | | 10/1994 |
| JP | 2000-182576 A | | 6/2000 |
| JP | 2008-084803 A | | 4/2008 |

* cited by examiner

*Primary Examiner* — Tan N Tran  
*Assistant Examiner* — Scott R Wilson  
(74) *Attorney, Agent, or Firm* — Westerman, Hattori, Daniels & Adrian, LLP

(57) ABSTRACT

A laser welding device for manufacturing a prismatic battery 10 of the invention has a pair of jigs 12A, 12B for securing a prismatic battery outer can B1, a gas supply section for supplying inert gas to welding points of a sealing cover B2 fitted to the prismatic battery outer can B1, and a laser unit 11 for irradiating laser beam. Each of the jigs 12A, 12B is provided with a slit-shaped blower outlet and the blower outlet is positioned below the welding points. The inert gas is supplied to the blower outlet from the gas supply section and is blown from the blower outlet to the welding points from below. The laser welding device for manufacturing a prismatic battery 10 can obtain a laser welding device that welds the sealing cover B2 fitted to the prismatic battery outer can B1 fast, preventing weld droops and allowing uniform welding.

19 Claims, 10 Drawing Sheets

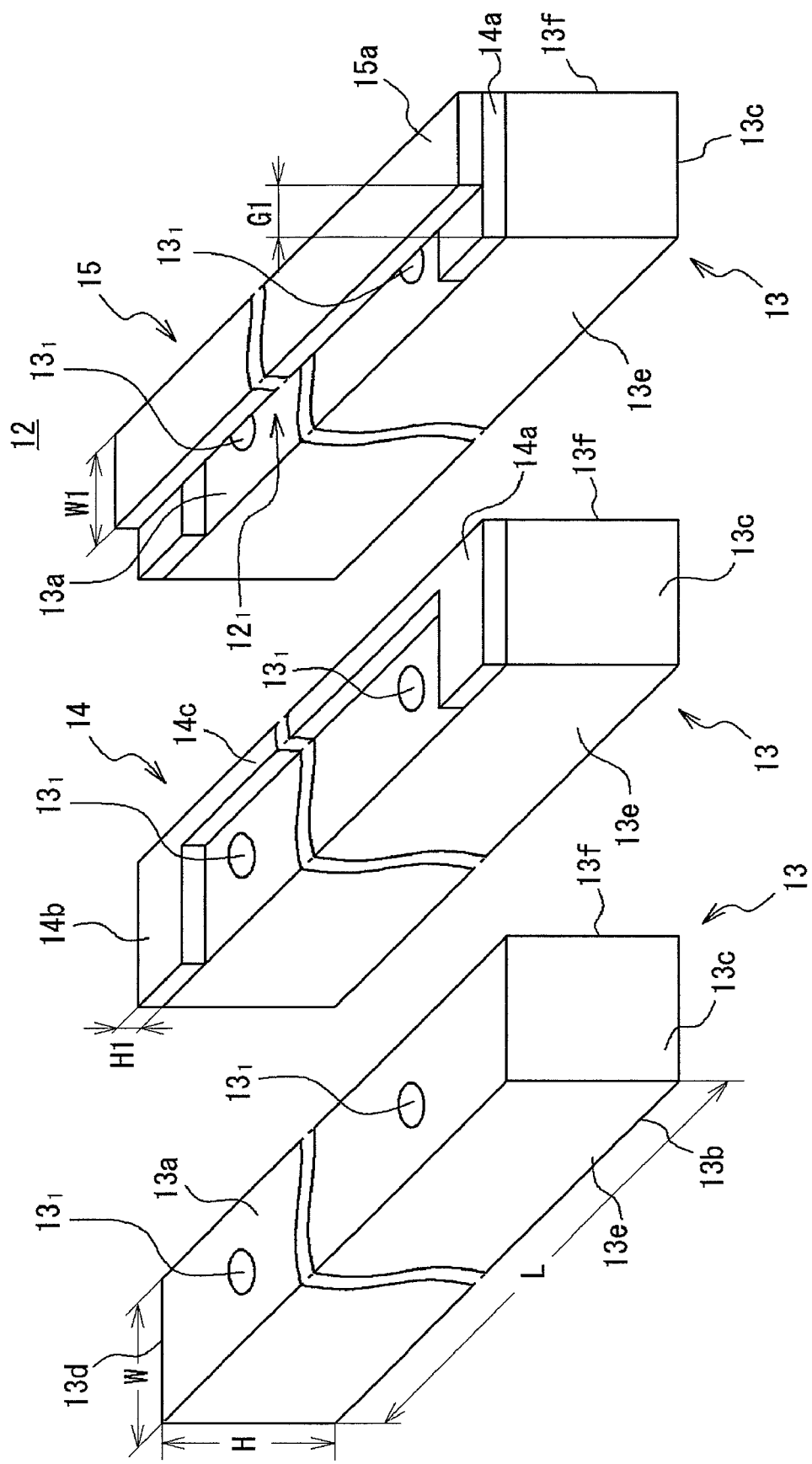

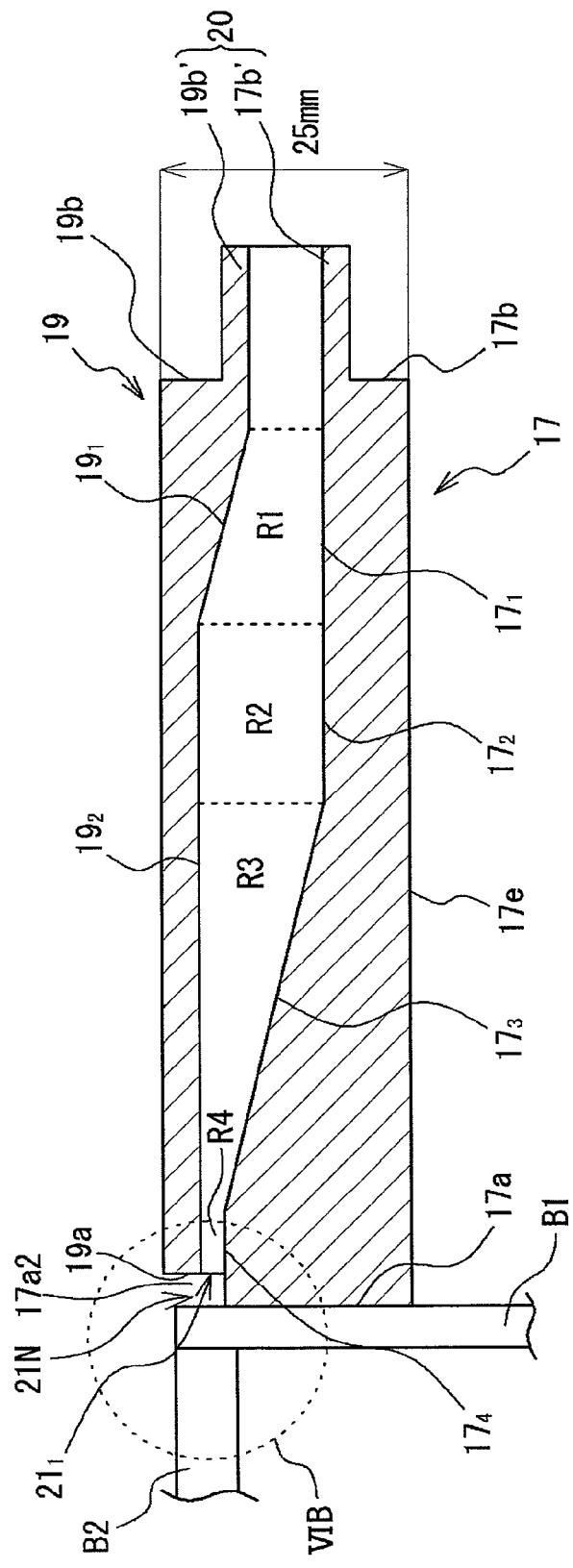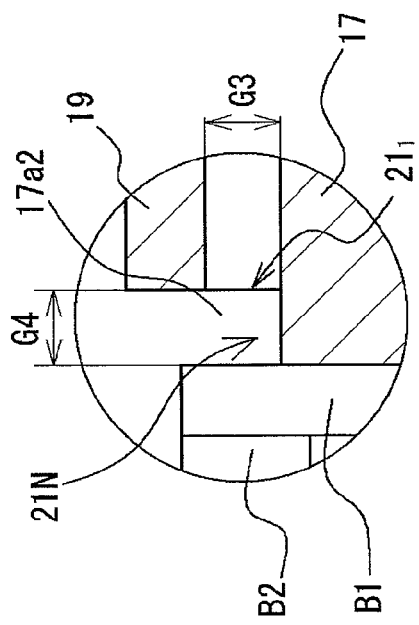

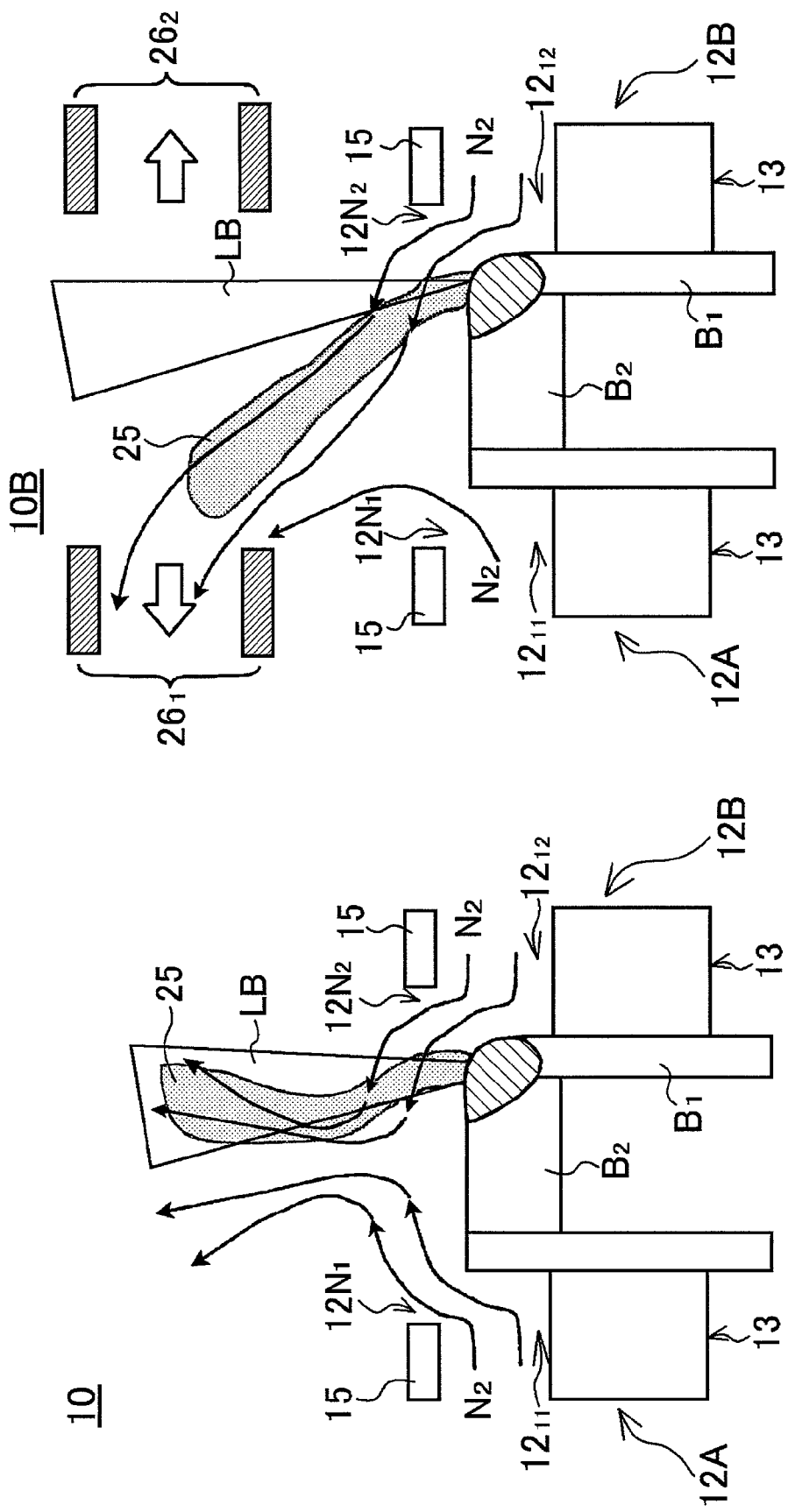

METHOD FOR MANUFACTURING PRISMATIC BATTERY, AND LASER WELDING JIG AND LASER WELDING DEVICE FOR MANUFACTURING THE SAME

TECHNICAL FIELD

The present invention relates to methods for manufacturing a prismatic battery, and laser welding jigs and laser welding devices for manufacturing the same that allow the prismatic battery to be welded at a fast rate and uniformly by a scanning laser beam. More particularly, the invention relates to a method for manufacturing a prismatic battery and a laser welding jig and a laser welding device for manufacturing a prismatic battery that, when laser welding a fitting section of a mouth portion of a prismatic battery outer can and a sealing cover of a relatively large prismatic battery, allows welding at high speed while preventing weld droop and, in addition, allows uniform welding.

BACKGROUND ART

Recently, in various nations, in order to cope with environmental pollution, soaring oil price hikes and the like, the development of clean energy as an alternative to oil has been promoted. In parallel to this, measures to reduce oil consumption have been studied in a wide range of fields. As a part of those studies, in the automotive field, electric vehicles and hybrid electric vehicles utilizing onboard batteries have been developed and some of the hybrid electric vehicles have already been marketed today. As for the batteries to be mounted on such electric vehicles and hybrid electric vehicles, the development of a lithium ion nonaqueous electrolyte secondary battery, hereinafter referred to as a lithium ion secondary battery, which has higher battery performance and reliability compared to other batteries, has been promoted.

Many lithium ion secondary batteries use a carbonaceous material such as graphite, which is capable of absorbing and desorbing lithium ions as a negative electrode active material, and a lithium transition metal composite oxide, which is also capable of absorbing and desorbing lithium ions and is represented by a formula $Li_xM_yO_2$ (where M is at least one of Co, Ni and Mn), more specifically, $LiCoO_2$, $LiNiO_2$, $LiNi_xCo_{1-x}O_2$ (where x is 0.01 to 0.99), $LiMnO_2$, $LiMn_2O_4$, and $LiCo_xMn_xNi_zO_2$ (where x+y+z=1), or $LiFePO_4$ and the like of a single kind or a mixture of two or more kinds as a positive electrode active material.

In devices that use the lithium ion secondary battery of this kind, for the purpose of higher space efficiency and heat dissipation, many use a prismatic battery in which power generating elements are housed inside a prismatic battery outer can. Such a prismatic lithium ion secondary battery is structured with an electrode assembly in which a positive electrode plate and a negative electrode plate with a separator interposed therebetween are spirally wound or stacked in a flattened manner being housed inside a prismatic battery outer can and a mouth portion of the prismatic battery outer can being sealed with a sealing cover. In the flat electrode assembly, both the positive electrode plate and the negative electrode plate are electrically insulated from the prismatic battery outer can and are electrically coupled, through the respective collectors, with a positive terminal and a negative terminal that are mounted on the sealing cover via an insulator.

The prismatic lithium ion second battery is fabricated by inserting the flat electrode assembly inside the prismatic battery outer can, then laser welding the sealing cover to the mouth portion of the prismatic battery outer can, subsequently pouring a nonaqueous electrolyte therein through an electrolyte pour hole and, thereafter, sealing the electrolyte pour hole. Such sealing methods by laser welding broadly fall into two categories: a method for laser welding by beaming a laser beam and jetting shielding gas simultaneously from a working head, and a method for laser welding by separating laser beam supply means and shielding gas supply means and scanning the laser beam single-handedly. The shielding gas is for the removal of oxygen from a welding point to create a working gas atmosphere suitable for laser welding, and an inert gas such as nitrogen gas and argon gas is used.

FIG. 9A is a perspective view schematically showing a laser welding device of the prior art employing a former method, and FIG. 9B is a cross-sectional view taken along the line IXB-IXB shown in FIG. 9A.

This laser welding device 100, as shown in FIG. 9A, has a working head 101, a pair of first and second sealing jigs 102A and 102B that clasp a prismatic battery B. The first and second sealing jigs 102A and 102B clasp both wide sidewall surfaces of a prismatic battery outer can B1 fitted with a sealing cover B2 at a mouth portion in an upper portion of the outer can B1, and position and secure the prismatic battery outer can B1 in a predetermined position. In the working head 101, one end of a cylindrical and hollow body of a predetermined length is tapered and, at the tip of the tapered end, an outlet of a predetermined size for a laser beam and shielding gas is provided. The other end of the cylindrical body of the working head 101 is coupled with a laser oscillator and a shielding gas supply source via flexible supply pipes not shown in the drawing. In the laser welding devices of this type, the laser oscillator used is typically a pulsed oscillator. The working head 101 is operated with an X-Y table and is adapted to move the outlet of the working head 101 to the welding point of the mouth portion of the prismatic battery outer can B1 and the sealing cover B2 and to simultaneously output a laser beam LB and a shielding gas $N_2$ from the outlet to weld.

FIG. 10 is a perspective view schematically showing a laser welding device employing the latter method, i.e., the welding method by separating the laser beam and shielding gas.

In this laser welding device 103, the shielding gas is not supplied from the working head and is supplied via a separate route to a boxed container 104 of a predetermined size in which the prismatic battery is to be contained. The container 104 is a bottomed container in which the prismatic battery and a predetermined amount of gas are to be contained, and has an opening 106 formed at an upper wall surface thereof exposing the sealing cover B2 portion of the prismatic battery and provided with gaps formed to jet the gas from the circumference of the sealing cover B2. The container 104 has a gas supply inlet 105 formed on one sidewall, and the gas supply outlet is coupled with a gas supply pipe not shown in the drawing. In the laser welding device 103, the prismatic battery outer can B1 fitted with the sealing cover B2 in the mouth portion in advance is contained in the boxed container 104 and laser welding is carried out by supplying the shielding gas from the gas supply inlet 105 and scanning the laser beam LB from a laser head not shown.

DISCLOSURE OF THE INVENTION

In the above-described laser welding device 100 of the prior art, as shown in FIG. 9A, since the shielding gas $N_2$ is jetted out and the laser beam LB is beamed to the welding point from the working head 101 positioned above the welding point, a weld droop as shown in FIG. 9B is apt to occur more often resulting in varied welded conditions. Further, in the laser welding device 100, the laser head is scanned using the X-Y table and the movement of a blower outlet for the gas for creating a working atmosphere is coordinated with the movement of the working head. For this reason, in the laser welding method using the above-described laser welding device 100 of the prior art, it is difficult to increase the working speed.

As a way to increase the working speed, a method for laser welding in which a laser beam of continuous-wave oscillation is irradiated is disclosed; refer to JP-A-2008-84803, for example. However, since the laser welding method irradiating a laser beam of continuous-wave oscillation requires scanning of the laser beam at high speed, it is difficult to obtain the required scanning speed over the entire welding area in an ordinary scanning method, for example, a scanning method using an X-Y table. Consequently, an optical scanning system that scans the laser beam is used. However, when such optical scanning system is used, it is not possible to move the blower outlet for the gas for creating working atmosphere in coordination with the irradiating position of the laser, thus it necessitates the entire welding area to be in the a working gas atmosphere suitable for welding. As a consequence, as in the above-described laser welding device 103 shown in FIG. 10, a laser welding device that replaces the air with the atmosphere gas by surrounding the proximity of the welding area and flowing the atmosphere gas therein for a long time needs to be employed.

Further, although a method for welding in which a laser beam of continuous-wave oscillation is irradiated is disclosed in JP-A-2000-182576, there are some implicit problems in that a dimensional error occurs resulting from protrusions of the melting portion sticking out of the outer side of the outer can and the like. Furthermore, while a laser processing device having a clamp member provided with an outlet for shielding gas is disclosed in JP-A-H6-292989, it cannot be used for sealing the outer can of the prismatic battery.

SUMMARY

An object of the present invention is to provide a method for manufacturing a prismatic battery, a laser welding jig and a laser welding device for manufacturing a prismatic battery that allows welding at high speed while preventing weld droop and, in addition, allowing uniform welding by providing a blower outlet on a jig that secures a work piece such as a prismatic battery outer can and by blowing shielding gas to the welding point in uniform flow distribution.

According to one aspect of the present invention, a method for manufacturing a prismatic battery includes laser welding by using a laser welding jig provided with a securing section for securing a prismatic battery outer can having a mouth portion at an upper portion thereof and a gas supply section for supplying an inert gas, and by supplying the inert gas from the laser welding jig to a welding point between the prismatic battery outer can and a sealing cover that is fitted to the mouth portion of the prismatic battery outer can, in which the jig being used as the laser welding jig has the securing section provided with a slit-shaped blower outlet at a position below the welding point, the inert gas is supplied from the gas supply section to the slit-shaped blower outlet, and the inert gas is blown from the slit-shaped blower outlet upward to the welding point from below to carry out the laser welding.

In the above-described method for manufacturing a prismatic battery according to one aspect of the invention, since the jig used as the laser welding jig for securing the prismatic battery that is a work piece is provided with the slit-shaped blower outlet, when the inert gas is supplied to the blower outlet, the entire welding area immediately becomes a shielding gas atmosphere composed of the inert gas. Accordingly, since a good and stable working gas atmosphere is obtained over the entire welding area and, in addition, a waiting time for obtaining the working gas atmosphere is eliminated, the work can be carried out efficiently. Further, since the inert gas is blown out from the position extremely close to the welding area, the shielding gas atmosphere can be obtained even at a small flow rate, thereby reducing the amount of inert gas required. Furthermore, since the inert gas is blown upward from below the welding point, the outer portion of the prismatic battery that is the welding point is reduced from melting more than necessary, thereby preventing weld droop from occurring on the melting portion of the outer side of the prismatic battery.

In the method for manufacturing a prismatic battery described above, it is preferable that the jig used as the laser welding jig be formed with the width of the slit-shaped blower outlet being larger than the widths of the prismatic battery outer can and the sealing cover that are the welding point.

In the above-described method for manufacturing a prismatic battery according to one aspect of the invention, since the jig used as the laser welding jig is formed with the width of the blower outlet for gas being larger than the widths of the prismatic battery outer can and the sealing cover, the inert gas can be supplied to the welding point with uniform flow velocity distribution.

Further, in the method for manufacturing a prismatic battery described above, it is preferable that the jig used as the laser welding jig be provided with the slit-shaped blower outlet having a top plate being positioned at approximately the same plane as the welding point and the other portions of the slit-shaped blower outlet being positioned below the welding point.

In the above-described method for manufacturing a prismatic battery according to one aspect of the invention, since the jig used as the laser welding jig is arranged with the top plate being positioned at approximately the same plane as the welding point and the other portions of the slit-shaped blower outlet being positioned below the welding point, the inert gas is prevented from being stagnant around the welding point and is effectively blown upward to the welding point from below. In addition, by positioning the top plate at approximately the same plane as the welding point, as the height of the portion of the top plate positioned higher than the welding point can be made low (for example, 5 mm or less, preferably 3 mm or less), the top plate can be prevented from melting by a part of the irradiating laser beam hitting directly, melting by the reflection of the laser beam, or being damaged by plasma generated when laser welding, thereby obtaining a laser welding jig with a long life.

Further, in the method for manufacturing a prismatic battery described above, it is preferable that the jig used as the laser welding jig be provided with the securing section having a pair of clasping members for clasping and securing the prismatic battery outer can and each of the pair of clasping members being formed with the slit-shaped blower outlet.

In the above-described method for manufacturing a prismatic battery according to one aspect of the invention, since the jig used as the laser welding jig clasps and secures the prismatic battery outer can by the pair of clasping members, the prismatic battery outer can can be secured simply and, in addition, the laser welding device producing the above-described operational advantages can be provided.

Further, in the method for manufacturing a prismatic battery described above, it is preferable that the jig used as the laser welding jig be provided with the clasping member having a gas supplying inlet communicating with the slit-shaped blower outlet and the gas supplying inlet being coupled with the gas supply section.

In the above-described method for manufacturing a prismatic battery according to one aspect of the invention, the inert gas can be supplied to the welding point in a simple structure.

Further, in the method for manufacturing a prismatic battery described above, it is preferable that the jig used as the laser welding jig be arranged with the securing section having a housing provided inside with a room of a predetermined shape, the slit-shaped blower outlet being formed at an exit of the room and a gas inlet being formed at an entrance of the room, and a shape and a size of a cross-section of the room parallel to the slit-shaped blower outlet of the room being varied progressively from the entrance to the exit of the room making the gas supplied from the gas inlet to be blown out from the slit-shaped blower outlet being diffused, flow regulated and accelerated.

In the above-described method for manufacturing a prismatic battery according to one aspect of the invention, while the flow rate of inert gas, i.e. the strength of the gas blown, affects weld conditions, since the jig used as the laser welding jig is arranged, by diffusing, flow regulating and accelerating the gas supplied from the gas inlet, to blow out the inert gas from the slit-shaped blower outlet with uniform flow velocity distribution, a good weld condition can be obtained eliminating welding variations and the like.

Further, in the method for manufacturing a prismatic battery described above, it is preferable that the jig used as the laser welding jig be provided with the room from the entrance towards the exit thereof having a diffusion chamber with lengths of cross section thereof parallel to the slit-shaped blower outlet being progressively larger in both directions parallel to and intersecting at right angles with an extending direction of the slit-shaped blower outlet, a flow regulating chamber continuing from the diffusion chamber with a shape of cross section thereof parallel to the slit-shaped blower outlet being maintained constant, and an acceleration chamber continuing from the flow regulating chamber with the length of cross section thereof parallel to the slit-shaped blower outlet in the direction parallel to the extending direction of the slit-shaped blower outlet being maintained constant and the length of the cross section thereof parallel to the slit-shaped blower outlet in the direction intersecting at right angles with the extending direction of the slit-shaped blower outlet being progressively smaller, an exit of the acceleration chamber being the slit-shaped blower outlet.

In the above-described method for manufacturing a prismatic battery according to one aspect of the invention, since the jig used as the laser welding jig has the room of the housing sectioned to the diffusion chamber, flow regulating chamber and acceleration chamber of the specific shapes described above, the inert gas of uniform flow velocity distribution can be blown out from the slit-shaped blower outlet.

Further, in the method for manufacturing a prismatic battery described above, it is preferable that the jig used as the laser welding jig be arranged with the diffusion chamber, the flow regulating chamber, and the acceleration chamber being in a single line in the room of the housing.

In the above-described method for manufacturing a prismatic battery according to one aspect of the invention, since the jig used as the laser welding jig is arranged with the diffusion chamber, flow regulating chamber and acceleration chamber being in a single line, it can efficiently make the inert gas be in uniform flow velocity distribution. In addition, since the uniform flow velocity distribution can be obtained as long as the diffusion chamber, flow regulating chamber, and acceleration chamber are arranged in a single line, even if the flow path is bent towards the welding point at the slit-shaped blower outlet, space efficiency can be enhanced as the diffusion chamber, flow regulating chamber and acceleration chamber may be arranged in the vertical direction.

Further, in the method for manufacturing a prismatic battery described above, it is preferable that the jig used as the laser welding jig be provided with the securing section having a pair of housings provided inside with the room of the predetermined shape and each of the pair of housings being provided with a clasping member for clasping and securing the prismatic battery outer can, and the laser welding be carried out while the prismatic battery outer can is secured between the clasping members formed in each of the pair of housings.

In the above-described method for manufacturing a prismatic battery according to one aspect of the invention, since the jig used as the laser welding jig clasps and secures the prismatic battery outer can with the pair of housings, the method for manufacturing a prismatic battery that simply secures the prismatic battery outer can and produces the above-described operational advantages can be provided.

Further, in the method for manufacturing a prismatic battery described above, it is preferable that the jig used as the laser welding jig controls the flow rate of the inert gas blown from the slit-shaped blower outlet positioned far from the welding point to be smaller than the flow rate of the inert gas blown from the slit-shaped blower outlet positioned close to the welding point.

In the above-described method for manufacturing a prismatic battery according to one aspect of the invention, since the jig used as the laser welding jig causes the inert gas to be blown upward from below at both sides of the welding point, the inert gas blown out from both sides collides above the welding point and moves further upward. Meanwhile, when laser welding, the dispersed particles appeared by welding may float in the light path of the laser beam blocking the laser beam. In this case, the laser beam reaching the welding point is weakened, and faulty welding may occur.

In the above-described method for manufacturing a prismatic battery according to one aspect of the invention, the jig used as the laser welding jig may be provided with a flow rate control means that controls the flow rate of the inert gas blown from the slit-shaped blower outlet positioned far from the welding point to be smaller than the flow rate of the inert gas blown from the slit-shaped blower outlet positioned close to the welding point. Accordingly, while welding, since the inert gas blown from the slit-shaped blower outlet positioned close to the welding point flows towards the far side from the welding point rather than above the welding point, the dispersed particles also flow floating towards the far side from the welding point. Consequently, according to the method for manufacturing a prismatic battery of one aspect of the invention, since the particles dispersed by welding are prevented from flowing above the welding point, the laser beam is prevented from being blocked by the particles dispersed by welding, thereby surely reducing the occurrence of faulty welding.

Further, in the method for manufacturing a prismatic battery described above, it is preferable that the jig used as the laser welding jig be provided with an exhaust outlet formed at an upper position of the securing section along the slit-shaped blower outlet in planar view and exhaust means, the exhaust outlet being coupled with the exhaust means, and the exhaust means controlling the suction rate of the exhaust outlet positioned far from the welding point to be larger than the suction rate of the exhaust outlet positioned close to the welding point.

In the above-described method for manufacturing a prismatic battery according to one aspect of the invention, since the jig used as the laser welding jig controls the suction rate of the exhaust outlet positioned far from the welding point to be larger than the suction rate of the exhaust outlet positioned close to the welding point, when welding, the inert gas blown from the slit-shaped blower outlet positioned close to the welding point flows towards the far side of the welding point rather than above the welding point, whereby the dispersed particles also flow floating towards the far side from the welding point. Consequently, according to the method for prismatic battery of one aspect of the invention, since the particles dispersed by welding are prevented from flowing above the welding point, the laser beam is prevented from being blocked by the particles dispersed by welding, thereby surely reducing the occurrence of faulty welding.

In the above-described laser welding jig for manufacturing a prismatic battery according to one aspect of the invention, particularly when both the flow rate control means and the exhaust control means are provided at the same time, it produces a synergistic effect for both and the laser beam is further prevented from being blocked by the particles dispersed by welding, thereby reducing the occurrence of faulty welding even more surely.

According to one aspect of the invention, a laser welding jig for manufacturing a prismatic battery includes a securing section for securing a prismatic battery outer can having a mouth portion at an upper portion thereof, and a gas supply section for supplying an inert gas, in which the inert gas is supplied to a welding point between the prismatic battery outer can and a sealing cover that is fitted to the mouth portion of the prismatic battery outer can, the securing section is provided with a slit-shaped blower outlet at a position below the welding point, the gas supply section supplies the inert gas to the slit-shaped blower outlet, and the slit-shaped blower outlet blows the inert gas upward to the welding point from below to carry out laser welding.

In the above-described laser welding jig for manufacturing a prismatic battery according to one aspect of the invention, the laser welding jig that produces the advantages of the method for manufacturing a prismatic battery of one aspect of the invention described above can be obtained.

Further, according to one aspect of the invention, a laser welding device for manufacturing a prismatic battery includes a laser welding jig for manufacturing a prismatic battery including a securing section for securing a prismatic battery outer can having a mouth portion at an upper portion thereof, and a gas supply section for supplying an inert gas, the inert gas being supplied to a welding point between the prismatic battery outer can and a sealing cover that is fitted to the mouth portion of the prismatic battery outer can, and a laser unit for delivering a laser beam, in which the securing section of the laser welding jig for manufacturing a prismatic battery is provided with a slit-shaped blower outlet at a position below the welding point, the gas supply section supplies the inert gas to the slit-shaped blower outlet, and the slit-shaped blower outlet blows the inert gas upward to the welding point from below to carry out laser welding.

In the above-described laser welding device for manufacturing a prismatic battery according to one aspect of the invention, since the temperature of a lower portion of the outer side surface of the prismatic battery outer can is not likely to rise, the amount of metal to droop is reduced, whereby a dimensional error in that the protrusions of the melting portion stick out of the outer side of the prismatic battery outer can is not likely to occur.

BRIEF DESCRIPTION OF THE DRAWINGS

The present invention will be described with reference to the accompanying drawings, wherein like numbers reference like elements.

FIG. 2A is a perspective view of one side of clasping members of a laser sealing jig constituting the laser welding device shown in FIG. 1, FIG. 2B is a perspective view of the clasping member in combination with a U-shaped frame, and FIG. 2C is a perspective view showing the clasping member in combination with the U-shaped frame and a top panel.

FIG. 6A is an enlarged cross-sectional view taken along the line VIA-VIA shown in FIG. 5, and FIG. 6B is an enlarged cross-sectional view of a VIB part shown in FIG. 6A.

FIG. 8A is a cross-sectional view illustrating the flow of gas of the laser welding device according to the first embodiment, and FIG. 8B is a cross-sectional view illustrating the flow of gas of a laser welding device according to a third embodiment of the invention.

DESCRIPTION OF EXEMPLARY EMBODIMENTS

Exemplary embodiments of the present invention will be described with reference to the accompanying drawings below. It should be appreciated, however, that embodiments described below are intended to illustrate examples of a method for manufacturing a prismatic battery, a laser welding jig and a laser welding device for manufacturing a prismatic battery that carry out the technical concepts of the invention, and are not intended to limit the invention to those particular examples. The invention could equally well be applied to yield other embodiments within the spirit and scope of the claims.

First Embodiment

Figure 1:
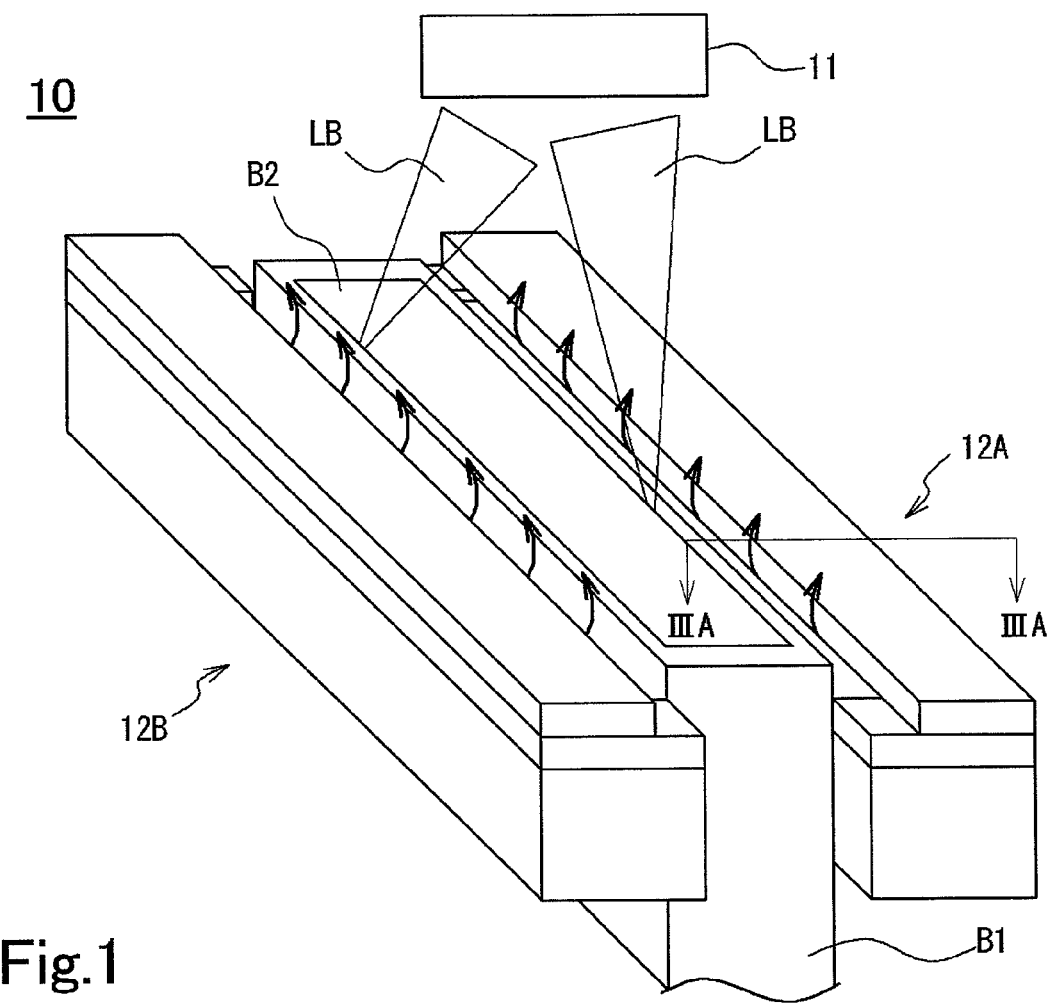
FIG. 1 is a diagram schematically illustrating a laser welding device according to a first embodiment of the invention.
Figure 3A:
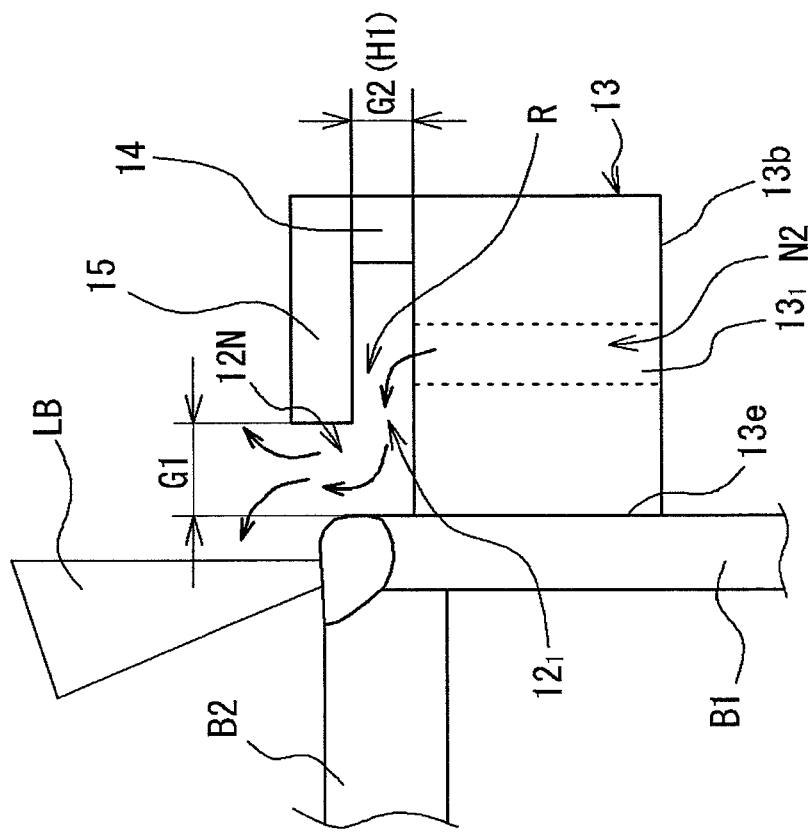
FIG. 3A is a cross-sectional view taken along the line IIIA-IIIA shown in FIG. 1.
Figure 3B:
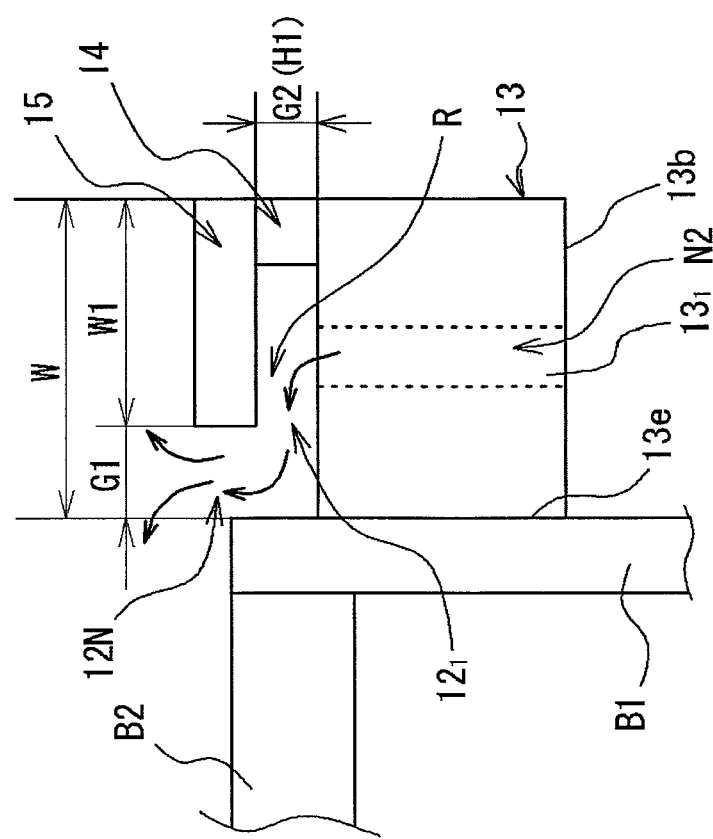
FIG. 3B is a cross-sectional view illustrating a welded condition under the condition shown in FIG. 3A.

First, with reference to FIGS. 1 to 3, a laser welding device for manufacturing a prismatic battery according to a first embodiment of the present invention will be described. FIG. 1 is a diagram schematically illustrating the laser welding device for manufacturing a prismatic battery according to the first embodiment. FIG. 2A is a perspective view of one side of clasping members of a laser sealing jig constituting the laser welding device for manufacturing a prismatic battery shown in FIG. 1, FIG. 2B is a perspective view of the clasping member in combination with a U-shaped frame, and FIG. 2C is a perspective view showing the clasping member in combination with the U-shaped frame and a top panel. FIG. 3A is a cross-sectional view taken along the line IIIA-IIIA shown in FIG. 1, and FIG. 3B is a cross-sectional view illustrating a welded condition under the condition shown in FIG. 3A.

A laser welding device for manufacturing a prismatic battery 10 according to the first embodiment has a laser unit 11 provided with a laser oscillator and a beam scanner, a pair of first and second laser sealing jigs (hereinafter referred to as first and second sealing jigs) 12A and 12B for clasping a prismatic battery outer can B1 provided with a slit-shaped blower outlet $12_1$ for supplying an inert gas to a welding point of the battery, and a gas supply section (not shown) for supplying the inert gas to these sealing jigs. The first and second sealing jigs 12A and 12B correspond to the laser welding jig for manufacturing a prismatic battery of the invention. The laser oscillator used in the laser unit 11 is a laser oscillator of continuous-wave oscillation. This laser oscillator is attached with the beam scanner enabling the beam to be scanned in X-Y directions and is adapted to irradiate the laser beam to the welding point. These constituents of the laser unit 11 used are of known types, and thus their specific descriptions are omitted.

Since the first and second sealing jigs 12A and 12B share the same structure, one side of the sealing jig with the reference numeral 12 will be described with reference to FIG. 2. The sealing jig 12 has, as shown in FIG. 2, a clasping member 13 in a rectangular parallelepiped shape having predetermined width, length and height, an approximately U-shaped frame body 14 to be attached to one wall surface of the clasping member, and a top plate 15 covering a part of the space formed by the U-shaped frame body 14 and forming a gas blower outlet of a predetermined size between the one wall surface of the clasping member 13 and an underside wall of the top plate 15, and these members are formed by molded plastic or of metallic material. The clasping member 13 corresponds to the securing section of the invention.

The clasping member 13, as shown in FIG. 2A, is in a rectangular parallelepiped shape having predetermined width W, length L and height H, and has upper and lower walls 13a and 13b and front and rear walls 13e and 13f of a relatively large length, and left and right walls 13c and 13d of an approximately rectangular shape. The length L of the clasping member 13, as shown in FIG. 1, is slightly longer than the length of a sidewall surface of the prismatic battery B in a longitudinal direction thereof. By making the length L slightly longer than that of the sidewall surface of the prismatic battery B, as will be described later, the slit-shaped blower outlet $12_1$ is formed along the length of the clasping member making it possible to supply an inert gas to the welding point in a wide area when welding the sealing cover of the prismatic battery.

The surface of one sidewall 13e is a clasping surface that clasps the prismatic battery B abutting the sidewall surface of the battery. The surface of the upper wall 13a has gas supply openings $13_1$ formed at both ends thereof in a longitudinal direction. These gas supply openings $13_1$ penetrate through to the lower wall 13b, and the exits of these through-holes are to be coupled with a gas supply section not shown in the drawing through a pipe not shown. As for the inert gas, nitrogen gas, argon gas or the like, for example, is used. While the gas supply openings $13_1$ are provided at both ends in the longitudinal direction, the opening may be provided at the midsection or the like.

The U-shaped frame body 14, as shown in FIG. 2B, has side frames 14a and 14b of a small length facing each other and a connecting frame 14c of a large length connecting one end of these side frames 14a and 14b, and the other ends of the side frames 14a and 14b are opened to form an approximate U-shape as a whole. The thickness of the U-shaped frame body 14 is set as H1.

The top plate 15, as shown in FIG. 2C, has a smaller width W1 than the width W of the clasping member 13 and is formed of a plate of a large length covering a part of the U-shaped space formed by the U-shaped frame body 14.

Using the clasping member 13, U-shaped frame body 14, and top plate 15, the sealing jig 12 is assembled. To assemble, first, on the three sides of the surface of the upper wall 13a provided with the gas supply openings $13_1$, the U-shaped frame body 14 is placed and secured in a position such that an open end thereof faces the sidewall 13e. The top plate 15 is then placed on the three frame sides of the U-shaped frame body 14 and is secured to complete assembling the sealing jig 12.

In the sealing jig 12 thus assembled, as shown in FIGS. 2C and 3A, the slit-shaped blower outlet $12_1$ is formed being surrounded by the surface of the upper wall 13a of the clasping member 13, an inner frame of the U-shaped frame body 14, and an underside surface of the top plate 15, and having a room R between the surface of the upper wall 13a and one end of the top plate 15. The slit-shaped blower outlet $12_1$ has the gas supply openings $13_1$ on the surface of the upper wall 13a in the room R of the clasping member 13. When the gas is supplied from these gas supply openings $13_1$, the gas is diffused inside the room R and is jetted out of the slit-shaped blower outlet $12_1$ towards the welding point of the prismatic battery outer can B1.

More specifically, in the sealing jig 12, as shown in FIG. 3A, the surface of the upper wall 13a of the clasping member 13 and the underside surface of the top plate 15 form a gap G2 therebetween. The gap G2 is the thickness H1 of the U-shaped frame body 14. Further, the surface extended from the surface of the sidewall 13e of the clasping member 13 and the end of the top plate 15 form a gap G1 therebetween. The gap G1 is the difference between the width W of the clasping member 13 and the width W1 of the top plate 15. The gap G1 is the gap from the sidewall surface of the battery B to be welded, and this gap section forms a jetting nozzle 12N. In the first embodiment, both the G1 and G2 are set to 1.00 mm. Furthermore, the upper surface of the top plate 15 is preferable to be positioned about 0 to 5 mm higher than the welding point and, more preferably, about 0 to 3 mm higher.

Next, with reference to FIGS. 1 to 3, a sealing process of the outer can of the prismatic battery using the laser welding device for manufacturing a prismatic battery 10 will be described. In the outer can sealing process, the battery outer can B1 is positioned between the pair of first and second sealing jigs 12A and 12B which constitute the laser welding device for manufacturing a prismatic battery 10, and is clasped and secured by the pair of sealing jigs 12A and 12B therebetween. Under this condition, from the gas supply openings $13_1$ of each clasping member 13 of both the sealing jigs 12A and 12B, the shielding gas, for example, nitrogen gas $N_2$ is supplied. The nitrogen gas $N_2$ supplied is diffused inside each room R of the sealing jigs 12A and 12B, and is jetted out to the welding point from each slit-shaped blower outlet $12_1$ through the jetting nozzle 12N.

FIG. 3A shows the condition of the nitrogen gas $N_2$ being supplied from one of the sealing jigs to the welding point of the battery outer can B1 and the sealing cover B2. In the shielding gas atmosphere being supplied with the nitrogen gas $N_2$, the laser beam LB is irradiated from the laser oscillator of the laser unit 11 to the welding point. By this irradiation, the outer can B1 and the sealing cover B2 are laser welded. Meanwhile, as the nitrogen gas $N_2$ is blown to the welding point upward from the slit-shaped blower outlet $12_1$ through the jetting nozzle 12N, a weld droop is prevented from occurring when welding.

A specific example of the sealing process of the outer can of the prismatic battery using the laser welding device for manufacturing a prismatic battery 10 will be described below. The outer can B1 and the sealing cover B2 used are both made of aluminum metal. The outer can B1 having a thickness of 0.4 mm at the section where the sealing cover B2 having a thickness of 1.4 mm is fitted was welded by focusing the laser beam having an output power of 1.9 kW emitted from a continuous-wave oscillation laser to a theoretical focusing diameter of 0.34 mm and scanning the point of focus at a rate of 120 mm per second with the beam scanner. The gaps G1 and G2 were both set to 1.0 mm. When welding, the nitrogen gas $N_2$ was blown through the jetting nozzle 12N having the gap G1. The nitrogen gas $N_2$ is jetted out from the slit-shaped blower outlet $12_1$ upward along the side surface of the outer can B1 from below passing through the jetting nozzle 12N having the gap G1 and towards the outside.

Consequently, immediately after the supply of the nitrogen gas $N_2$ was started, as the welding point was in a shielding gas atmosphere surrounded by the nitrogen gas, the welding was ready to be commenced without any waiting time. Furthermore, as the nitrogen gas $N_2$ was blown upward to the outer can from below, the distance of the melting portion expanding outside of the outer can was reduced from about 0.1 to about 0.03 mm, thereby preventing a dimensional error in that the protrusions of the melting portion stick out of the outer side of the outer can.

As a consequence, according to the laser welding device for manufacturing a prismatic battery 10, when flowing the shielding gas to obtain the working gas atmosphere suitable for welding, since the entire laser welding area becomes a nitrogen atmosphere immediately after the flow of the gas is started, the amount of shielding gas required is lessened and, in addition, the waiting time for obtaining the working gas atmosphere is eliminated, whereby the work can be carried out efficiently. Further, since the shielding gas is jetted out to the welding area from an extreme proximity thereof, the shielding gas atmosphere can be obtained at a small flow rate, thereby reducing the amount of shielding gas required. Furthermore, as the shielding gas is blown upward to the outer can from below as shown in FIG. 3, the temperature of a lower portion of the outer side surface of the outer can is not likely to rise. Accordingly, the amount of metal to droop is reduced, whereby the dimensional error in that the protrusions of the melting portion stick out of the outer side of the outer can is not likely to occur.

Second Embodiment

The laser welding device for manufacturing a prismatic battery 10 according to the first embodiment has the superior operational advantages described above. However, since the slit-shaped blower outlet $12_1$ of the sealing jig is long, the flow velocity of shielding gas jetted out from the blower outlet tends to vary depending on the point of jetting and the flow velocity at the long-side portion of the battery may become extremely low. For example, when the average flow velocity is 5 m/sec., the flow velocity distribution may become uneven with a minimum value of 0.3 m/sec and a maximum value of 6.8 m/sec. When the flow velocity distribution becomes uneven, the condition of the welding point is affected and, for example, welding variations, weld beads, or wrinkles are likely to occur.

Figure 4:
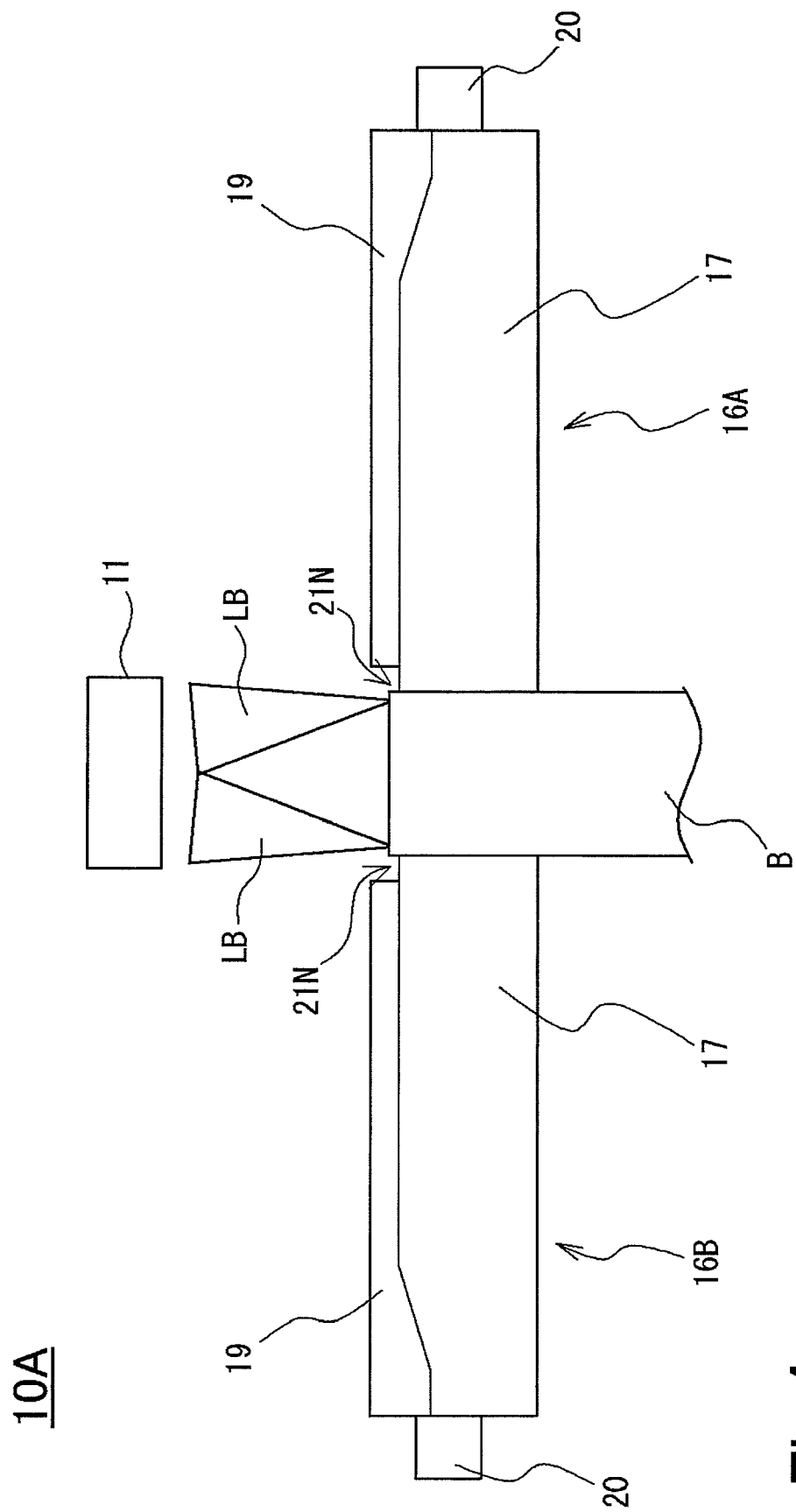
FIG. 4 is a side view of a laser welding device according to a second embodiment of the invention.

Accordingly, a laser welding device for manufacturing a prismatic battery 10A according to a second embodiment of the present invention shown below is a modification of the laser welding device for manufacturing a prismatic battery 10 of the first embodiment with an enhancement. The laser welding device according to the second embodiment will be described with reference to FIGS. 4 to 6.

The laser welding device for manufacturing a prismatic battery 10A according to the second embodiment has a laser unit 11 provided with a laser oscillator and a beam scanner, a pair of first and second laser sealing jigs 16A and 16B for clasping a prismatic battery B having a slit-shaped blower outlet $21_1$ for supplying inert gas to a welding point of the battery, and a gas supply section for supplying the inert gas to these sealing jigs. In the laser welding device for manufacturing a prismatic battery 10A, the structure of the sealing jig is different from that of the above-described laser welding device for manufacturing a prismatic battery 10, while other structures are the same. Since the pair of first and second sealing jigs 16A and 16B both share the same structure, one side of the sealing jigs will be described with reference to the sealing jig 16A.

The sealing jig 16A has a body case 17 having an opening formed at the top and a shallow recess 18 formed therein, and a lid 19 covering the opening of the body case. The body case 17 and the lid 19 constitute a housing of a predetermined size.

Figure 5:
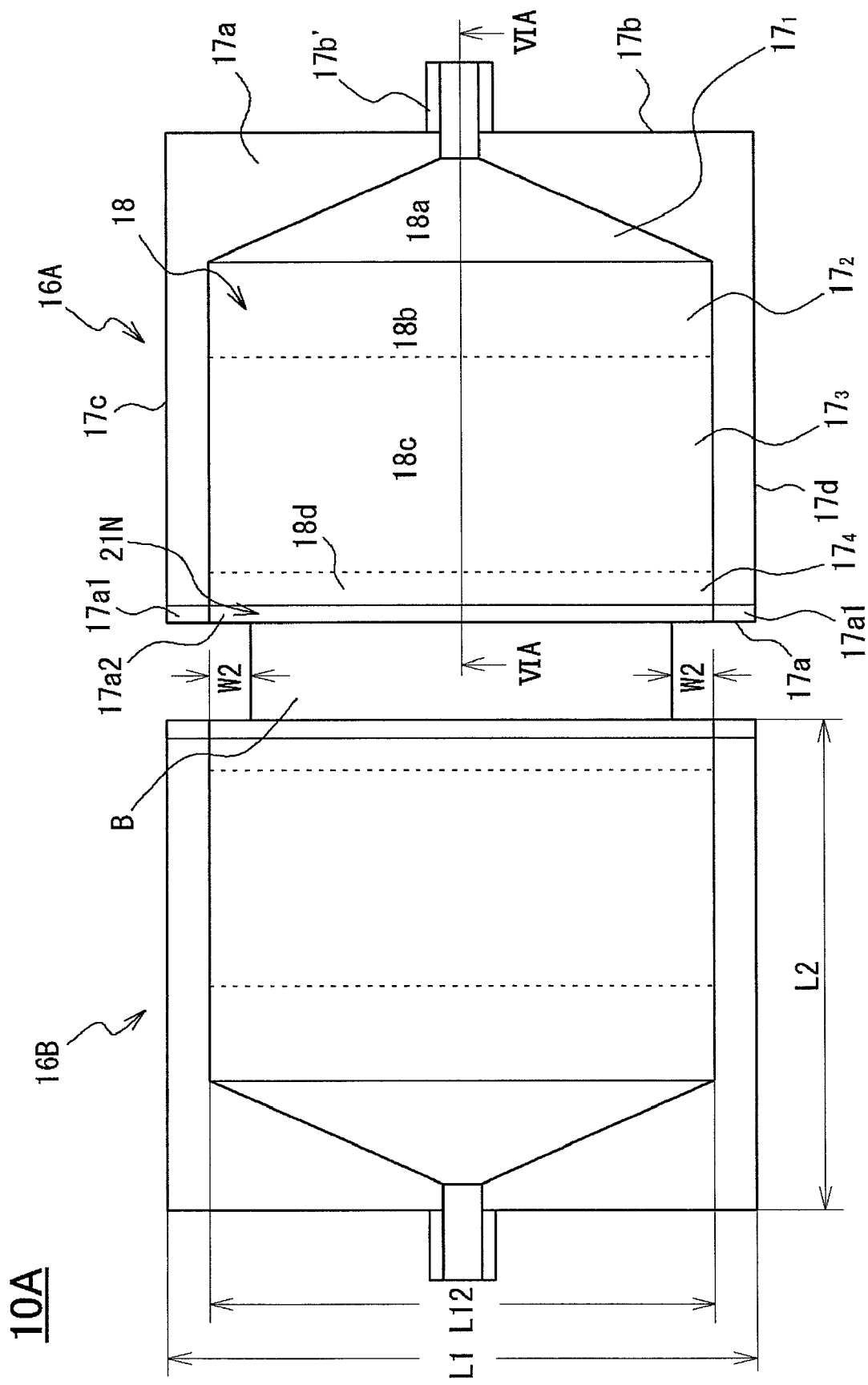
FIG. 5 is a plan view of a pair of sealing jigs of the laser welding device shown in FIG. 4 with cover plates removed to show the inside of body cases.

The body case 17, as shown in FIGS. 5 and 6, has front and rear walls 17a and 17b, left and right sidewalls 17c and 17d, and a bottom wall 17e, and is formed of a shallow bottomed container having the opening at the top and the shallow recess 18 therein. At the front wall 17a, formed are standing walls 17a1 that are a part of both ends thereof being raised upward to a predetermined height. Between the standing walls 17a1 at both ends is a top wall 17a2 of the front wall 17a. The height of the standing wall 17a1 corresponds to the height of the slit-shaped blower outlet $21_1$. Further, on the rear wall 17b, a half inlet 17b' in a semicircle shape is formed in the center. The body case 17 has the front wall 17a of a length L1, and the left and right sidewalls 17c and 17d of a length L2 and of a predetermined height, and is in a flat boxed shape as a whole.

The length L1 of the front wall 17a is the width of the prismatic battery B plus the thicknesses of each of the sidewalls 17c and 17d with a further addition of gaps W2 between each end of the battery and each of the sidewalls 17c and 17d. In other words, the distance L12 between each of the inner wall surfaces of the left and right sidewalls 17c and 17d is the length of the slit-shaped blower outlet $21_1$ which will be described later, and this length L12 is the length that forms the respective gaps W2 between each end of the prismatic battery B and each of the inner wall surfaces of the left and right sidewalls 17c and 17d. Further, the length L2 of the sidewall may be arbitrary and is set to 140 mm in the present embodiment. The gap W2 is set to 10 mm. In the body case 17, the surface of the front wall 17a is the clasping surface abutting the wall surface of the prismatic battery B to clasp the battery.

The recess 18 of the body case 17, as shown in FIG. 5, is divided into four sections of first to fourth sections 18a to 18d. The first section 18a is in an approximately triangular shape in planar view, and the vertex of the triangle is communicated with the half inlet 17b'. The bottom wall surface of this section, as shown in FIG. 6A, has a flat surface $17_1$. Subsequently, as similarly shown in FIGS. 5 and 6A, the second section 18b adjoining to the first section 18a is sectioned to have an approximately rectangular shape of a narrow width in planar view. The bottom wall surface of this section has a flat surface 172. The third section 18c adjoining to the second section 18b is sectioned to have an approximately rectangular shape of a wide width in planar view. The bottom wall surface of this section has a slant surface $17_3$ rising at a predetermined angle from the adjoining second section 18b towards the front wall 17a. The fourth section 18d has a flat surface $17_4$ continuing to the top wall 17a2 of the front wall 17a.

The lid 19 has a size sufficient to cover the opening of the recess 18 of the body case 17. In other words, the lid is constituted with a plate body having front and rear walls and left and right walls corresponding to the front and rear walls 17a and 17b and the left and right sidewalls 17c and 17d, respectively, of the body case 17. In FIG. 6, the front and rear walls 19a and 19b of the lid 19 are shown. In the lid 19, the length in the horizontal direction, i.e. the length between the front and rear walls 19a and 19b is smaller than the length L2 of the body case 17 such that a predetermined gap G4 (refer to FIG. 6B) is formed between the extending line of the front wall 17a of the body case 17 and the front wall 19a of the lid 19. On the rear wall 19b, a half inlet 19b' in a semicircle shape is formed in the center.

The lid 19 is formed in a predetermined shape such that the underside surface thereof corresponds to the first to fourth sections 18a to 18d of the recess 18 of the body case 17. The underside surface corresponding to the first section 18a has a slant surface $19_1$ rising at a predetermined angle from the rear wall 19b towards the front wall 19a. The underside surface corresponding to the second to fourth sections 18b to 18d has a continuously flat surface $19_2$.

In the body case 17, the opening of the recess 18 is covered with the lid 19. When the opening of the recess 18 is covered with the lid 19, as shown in FIG. 6A, four rooms of first to fourth rooms R1 to R4 are formed inside. Further, the half inlet 17b' of the body case 17 and the half inlet 19b' of the lid 19 are joined together to form an inlet 20. The inlet 20 is coupled with an inert gas supply source through a pipe not shown in the drawing. The inlet 20 is communicated with the room R1.

The first to fourth rooms R1 to R4 are formed at the places corresponding to the first to fourth sections 18a to 18d of the body case 17. These rooms R1 to R4 are the rooms having respective predetermined shapes by the shapes of the sections 18a to 18d of the body case 17 and the underside surface of the lid 19. Furthermore, the rooms R1 to R4 form a closed chamber surrounded by the bottom wall surfaces $17_1$ to $17_4$ of the body case 17, the underside surface of the lid 19, and each of the sidewall surfaces of the body case 17 and the lid 19, with the first room R1 being the inlet 20 and an exit of the fourth room R4 being the slit-shaped blower outlet $21_1$.

The first room R1 is the room corresponding to the shape of the first section 18a and having an approximately triangular shape in planar view with the vertex thereof communicating with the inlet 20. The first room R1 has an elongated shape at the cross-section parallel to the slit-shaped blower outlet $21_1$, and the respective lengths thereof in a direction parallel to and in a direction intersecting at right angles with an extending direction of the slit-shaped blower outlet $21_1$ become progressively larger. Accordingly, when the inert gas is supplied to the room R1 from the inlet 20 and the gas enters the room R1 passing through the inlet 20 of a small diameter, the flow direction of the gas gradually expands. Accordingly, the first room R1 is a diffusion chamber for diffusing the gas.

The next adjoining second room R2 is a room provided with rectangular shaped walls corresponding to the second section 18b having an elongated shape at the cross section parallel to the slit-shaped blower outlet $21_1$, and the respective lengths thereof in the direction parallel to and in the direction intersecting at right angles with the extending direction of the slit-shaped blower outlet $21_1$ are maintained constant. In the second room R2, the gas diffused in the first room R1 is converted to be in an even flow. Accordingly, the room R2 serves as a flow regulating chamber.

The third room R3 has walls of an approximately triangular shape in side cross-sectional view between the slant surface of the third section 18c and the inner wall surface of the lid 19 and, more specifically, the third room R3 has an elongated shape at the cross-section parallel to the slit-shaped blower outlet $21_1$, and the length thereof in the direction parallel to the extending direction of the slit-shaped blower outlet $21_1$ is maintained constant and the length thereof in the direction intersecting at right angles with the extending direction of the slit-shaped blower outlet $21_1$ becomes progressively smaller, and the tip thereof is continued to the fourth room R4. The flow regulated gas in the second room R2 is compressed and accelerated as a flow passage being narrowed in the third room R3. Accordingly, the third room R3 is an acceleration chamber for accelerating the flow-regulated gas. The elongated shapes at the cross sections parallel to the slit-shaped blower outlet $21_1$ in the above-described first to third rooms R1 to R3 may arbitrarily take a rectangular shape, a rectangular shape with rounded corners, an octagonal shape with cut-off corners of a rectangle, a rectangular shape with semi-circled side ends, a long ellipse shape with cut-off ends, and the like.

The fourth room R4 is positioned at the exit end of the third room R3 forming the slit-shaped blower outlet $21_1$ connected to the jetting nozzle 21N with a gap G3 (refer to FIG. 6B) formed between the flat surface $17_4$ of the fourth section 18d and the flat surface $19_2$ of the underside surface of the lid 19. The slit-shaped blower outlet $21_1$ is formed at the position separated by the amount of the gap G4 (refer to FIG. 6B) from the extending line of the front wall 17a of the body case 17, and the jetting nozzle 21N of the gap G4 is formed by the slit-shaped blower outlet $21_1$ and the sidewall of the prismatic battery B. The slit-shaped blower outlet $21_1$ is formed surrounded by the left and right sidewalls 17c and 17d, the top wall of the front wall 17a, and the inner wall surface of the front wall 19a of the lid 19, with a horizontally long slit having the gap G3. The horizontal width of the slit-shaped blower outlet $21_1$ is the same as the length L12 between the left and right sidewalls 17c and 17d of the body case 17. This length is set such that there are the gaps W2 at both ends of the length of the prismatic battery B. The gap W2 is set to, for example, 10 mm.

In the sealing jig 16A, when the gas is supplied from the inlet 20, the gas passing through the inlet 20 enters the approximately triangular shaped room R1 and is diffused. The diffused gas is flow regulated in the room R2, sent to the next room R3, and is jetted out being accelerated from the jetting nozzle 21N passing through the slit-shaped blower outlet $21_1$. Furthermore, the upper surface of the lid 19 is preferable to be positioned about 0 to 5 mm higher than the welding point and, more preferably, about 0 to 3 mm higher.

Next, with reference to FIGS. 4 to 7, a sealing process of the outer can of the prismatic battery using the laser welding device for manufacturing a prismatic battery 10A will be described. In the outer can sealing process, the prismatic battery B is placed between the pair of first and second sealing jigs 16A and 16B, which constitute the laser welding device for manufacturing a prismatic battery 10A, and is clasped and secured by the pair of sealing jigs 16A and 16B (refer to FIGS. 4 and 5). Under this condition, from the inlets 20 of both sealing jigs 16A and 16B, the shielding gas, for example, nitrogen gas $N_2$ is supplied. The nitrogen gas $N_2$ supplied is diffused in each room of the sealing jigs 16A and 16B, and is jetted out from the jetting nozzle 21N through each of the slit-shaped blower outlets $21_1$. This blowing condition will be described with reference to the sealing jig 16A on one side. When the nitrogen gas $N_2$ is supplied from the gas inlet 20 to the room R1 and the gas passing through the inlet 20 of a small diameter enters the room R1, the gas is progressively diffused.

In the next adjoining second room R2, the diffused gas in the room R1 is converted to that of an even flow. In the third room R3, the flow regulated gas in the second room R2 is compressed and accelerated as the flow passage is narrowed down in the room R3. From the slit-shaped blower outlet $21_1$ of the fourth room R4, the inert gas is blown out at an even flow rate, i.e. with uniform flow velocity distribution. FIG. 6A shows the nitrogen gas $N_2$ being supplied to the welding point of the prismatic battery from the sealing jig 16A on one side. In the atmosphere of the nitrogen gas $N_2$ being supplied, the laser beam LB is irradiated to the welding point from the laser oscillator of the laser unit 11. By this irradiation, the outer can and the sealing cover are laser welded. Meanwhile, as the nitrogen gas $N_2$ is blown upward to the welding point from the slit-shaped blower outlet $21_1$ through the jetting nozzle 21N, a weld droop is prevented from occurring when welding.

Figure 7:
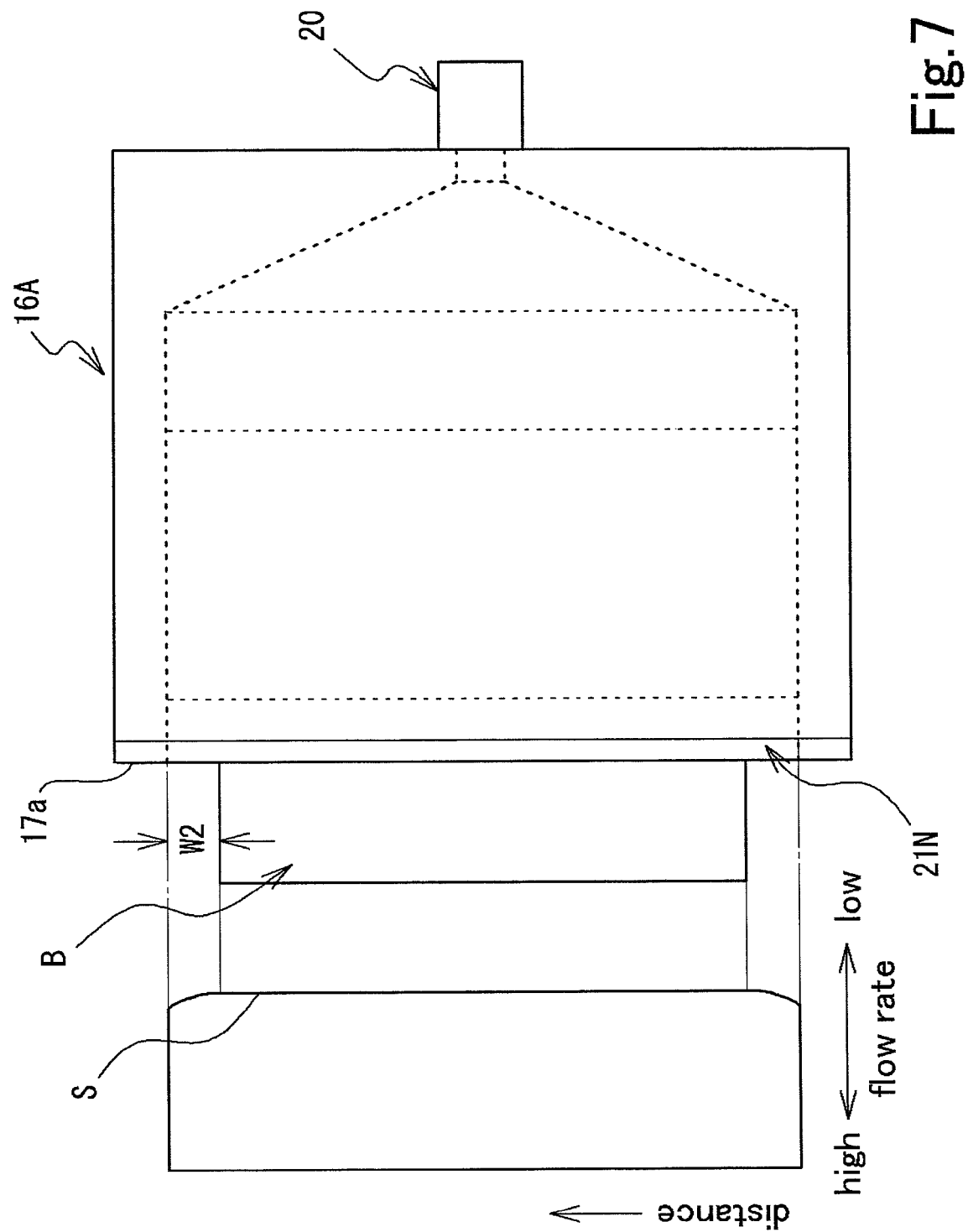
FIG. 7 is a plan view illustrating the flow velocity distribution of gas blown out from the sealing jig of the second embodiment.
Figure 9B:
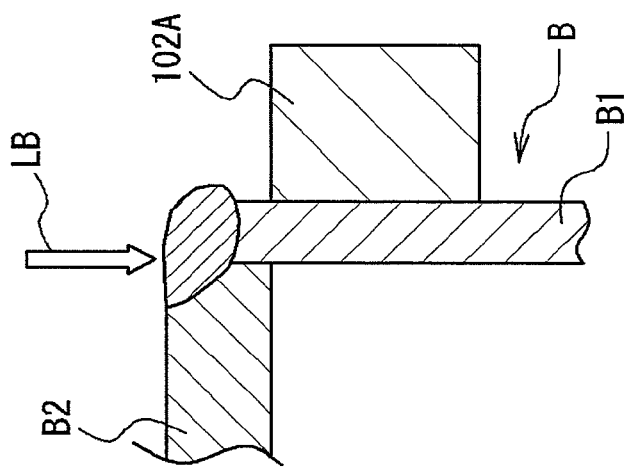
FIG. 9B is a cross-sectional view taken along the line IXB-IXB shown in FIG. 9A.
Figure 9A:
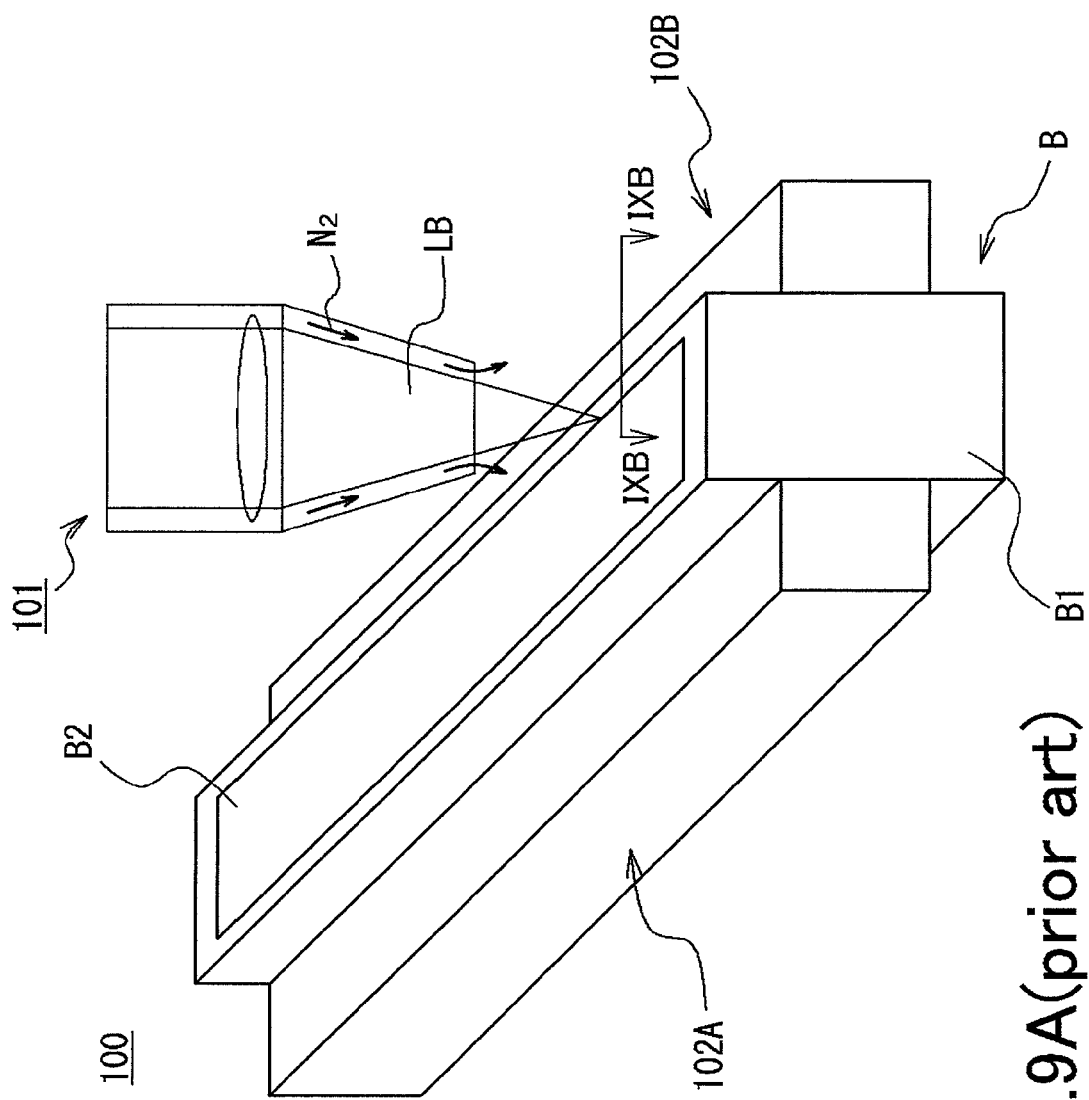
FIG. 9A is a perspective view schematically illustrating a laser welding device of the prior art.
Figure 10:
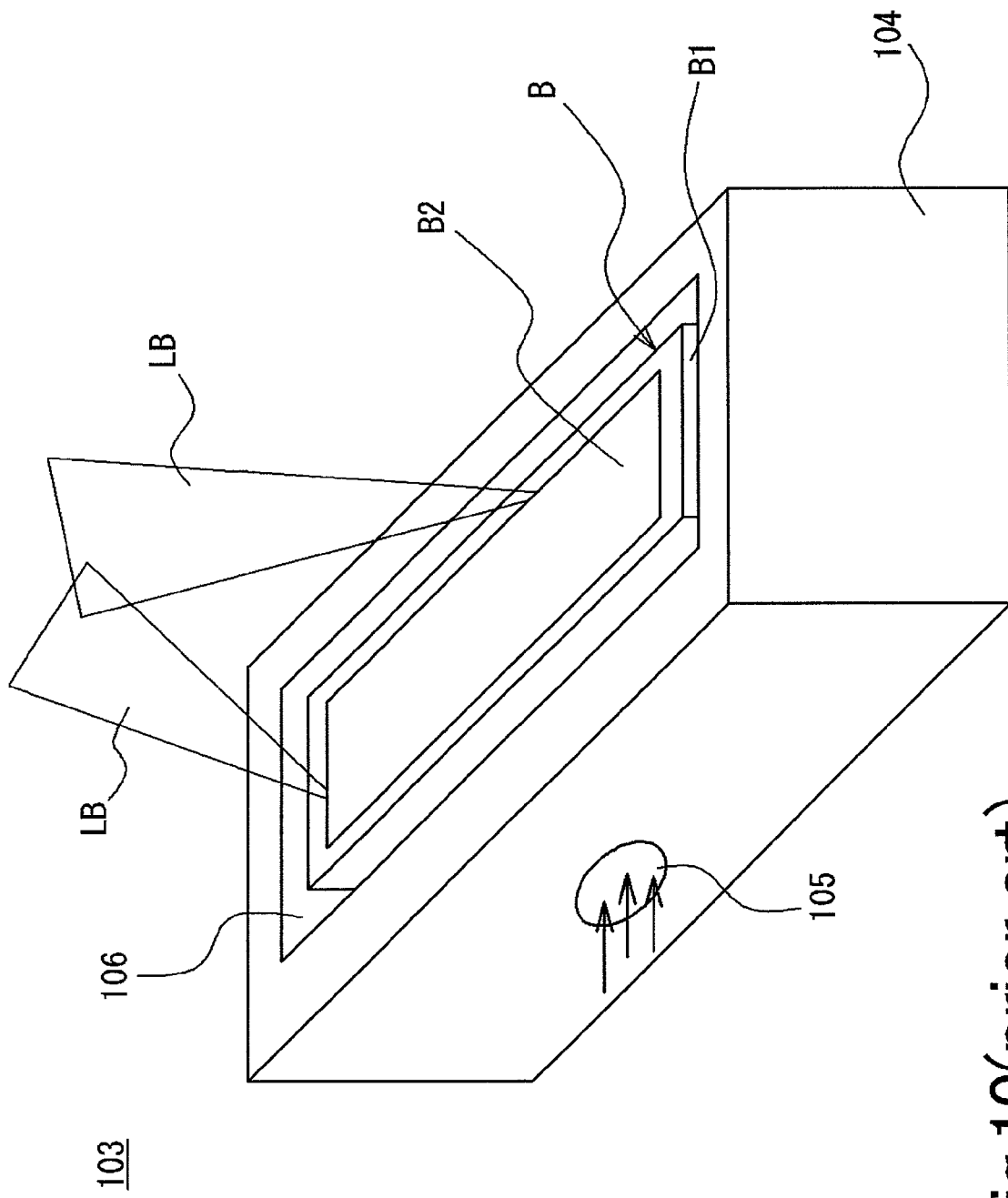
FIG. 10 is a perspective view schematically illustrating another laser welding device of the prior art.

Further, in the sealing jig 16A, as shown in FIG. 7, both ends of the slit-shaped blower outlet $21_1$ are protruded outward from the short side ends of the prismatic battery B by the gaps W2 (10 mm). By both ends of the blower outlet $21_1$ being protruded from the short side ends of the prismatic battery B by the gaps W2, the flow velocity of the gas at the welding point of the prismatic battery becomes uniform and the flow velocity at the gaps of both ends becomes fast. The symbol S shown in FIG. 7 indicates the flow velocity curve of the gas blown to the battery B. As can be seen in this curve, the flow velocity of the gas blown to the battery B is approximately constant and is fast at both ends. Consequently, at the welding point, the laser welding can be carried out with uniform gas flow velocity. While the gas blowing condition of the blower outlet $21_1$ of the sealing jig 16A on one side has been described above, the condition of the sealing jig 16B on the other side is also the same.

According to the laser welding device for manufacturing a prismatic battery 10A, by making the shape of gas flow passage as described above, since the flow velocity of the gas in the width direction of the gas blower outlet becomes uniform, the weld condition can be prevented from varying. By carrying out the welding after the gas for creating the working atmosphere suitable for laser welding is blown out evenly in a width direction of the battery from the slit-shaped blower outlet $21_1$ located at the upper portion of the jig for positioning the battery so that the entire welding area is in the working gas atmosphere suitable for laser welding, highly productive and highly stable welding can be carried out.

Third Embodiment

In laser welding, when a laser beam is irradiated, dispersed particles from the welding point float in the shielding gas and the floating dispersed particles may absorb the laser beam making the welding unstable. With reference to FIGS. 8A and 8B, the phenomenon in that the welding becomes unstable by such dispersed particles in laser welding with the laser welding device for manufacturing a prismatic battery 10 of the first embodiment, and a laser welding device for manufacturing a prismatic battery 10B according to a third embodiment of the invention with an additional structure to prevent occurrence of such phenomenon will be described below. FIG. 8A is a cross-sectional view illustrating the flow of inert gas of the laser welding device according to the first embodiment, and FIG. 8B is a cross-sectional view illustrating the flow of inert gas of the laser welding device according to the third embodiment. In FIGS. 8A and 8B, the same constituent elements as those shown in FIGS. 1 to 3 are given the same reference numerals, respectively, and their detailed descriptions are omitted.

As shown in FIG. 8A, in the laser welding device for manufacturing a prismatic battery 10 of the first embodiment, the flow rate of inert gas blown out from the slit-shaped blower outlet $12_{11}$, which is positioned far from the welding point (left side in the drawing shown in FIG. 8A) through the jetting nozzle $12N_1$ and that of the inert gas blown out from the slit-shaped blower outlet $12_{12}$, which is positioned close to the welding point (right side in the drawing shown in FIG. 8A), through the jetting nozzle $12N_2$ are set identically. In this case, the inert gas blown out of both jetting nozzles $12N_1$ and $12N_2$ flows upward. Meanwhile, dispersed particles 25 by welding appear from the laser welding point, and the dispersed particles 25 flow upward floating in the inert gas blown out from the jetting nozzle $12N_2$, which is positioned close to the welding point. Accordingly, as the dispersed particles 25 float along the laser beam LB, the laser beam LB may be largely blocked by the dispersed particles 25. Consequently, the laser beam LB irradiating the welding point is weakened, and faulty welding may result.

Therefore, in the laser welding device for manufacturing a prismatic battery 10B according to the third embodiment, by providing control means (not shown in the drawing) in the gas supply section coupled with the respective jetting nozzles $12N_1$ and $12N_2$ of the first and second sealing jigs 12A and 12B, the flow rate of inert gas blown out from the jetting nozzle $12N_1$ of the slit-shaped blower outlet $12_{11}$ which is positioned far from the welding point is controlled to be smaller than that of the inert gas blown out from the jetting nozzle $12N_2$ of the slit-shaped blower outlet $12_{12}$ which is positioned close to the welding point.

By adopting such a configuration, when welding, since the inert gas from the jetting nozzle $12N_2$ of the slit-shaped blower outlet $12_{12}$, which is positioned close to the welding point, flows, as shown in FIG. 8B, towards the far side from the welding point rather than above the welding point, the dispersed particles 25 appeared by welding also flow floating towards the far side from the welding point. Consequently, according to the laser welding device for manufacturing a prismatic battery 10B of the third embodiment, since the dispersed particles 25 by welding are prevented from flowing above the welding point, the laser beam LB is prevented from being blocked by the dispersed particles 25 by welding, whereby the occurrence of faulty welding is surely reduced.

Further, in the laser welding device for manufacturing a prismatic battery 10B according to the third embodiment, above the first and second sealing jigs 12A and 12B, exhaust outlets $26_1$ and $26_2$ are formed along the respective jetting nozzles $12N_1$ and $12N_2$ of the slit-shaped blower outlets $12_{11}$ and $12_{12}$ in planar view, these exhaust outlets $26_1$ and $26_2$ are coupled with respective exhaust means (not shown), and these exhaust means are provided with exhaust control means (not shown). Furthermore, by the exhaust control means, the suction rate of the exhaust outlet $26_1$ positioned far from the welding point is controlled to be larger than that of the exhaust outlet $26_2$ positioned close to the welding point.

By adopting such a configuration, even if the flow rate of gas from the jetting nozzles $12N_1$ and $12N_2$ of the slit-shaped blower outlets $12_{11}$ and $12_{12}$ is not controlled by the control means of the gas supply section, when welding, the inert gas from the jetting nozzle $12N_2$ of the slit-shaped blower outlet $12_{12}$ positioned close to the welding point flows far side from the welding point rather than above the welding point. Accordingly, in this case, since the dispersed particles 25 appeared by welding also flow floating towards the far side from the welding point, the laser beam LB is prevented from being blocked by the dispersed particles 25 by welding, whereby the occurrence of faulty welding is surely reduced.

Further, in the laser welding device for manufacturing a prismatic battery 10B according to the third embodiment, when both of the above-described flow rate control means of the gas supply section and the above-described exhaust outlets $26_1$ and $26_2$ and exhaust control means are provided at the same time, it produces a synergistic effect for both and the laser beam LB is further prevented from being blocked by the dispersed particles 25 by welding, whereby the occurrence of faulty welding is reduced more surely.

As has been described in the foregoing, according to the present invention, as the sealing jig for securing the battery outer can is provided with the slit-shaped blower outlet, when the inert gas is supplied to the blower outlet, the entire welding area immediately becomes a shielding gas atmosphere, providing a good and stable working atmosphere over the entire working area and, in addition, eliminating the waiting time required for obtaining a working atmosphere, whereby efficient work can be carried out. Additionally, as the inert gas is blown out from a position extremely close to the welding point, the shielding gas atmosphere can be obtained even at a small flow rate, thereby reducing the required amount of inert gas. Furthermore, as the inert gas is blown upward to the welding point from below, the prismatic battery outer can as a work of welding point can be reduced from melting more than necessary, whereby a dimensional error in that the protrusions of the melting portion stick out of the outer side the prismatic battery outer can can be prevented.

In the present invention, while the embodiments of laser welding devices applied to the prismatic battery have been exemplified, the present invention is not limited to the battery and may also be applied to other components (work).

What is claimed is:

1. A method for manufacturing a prismatic battery, the method comprising:
   laser welding by using a laser welding jig provided with a securing section for securing a prismatic battery outer can having side surfaces and a mouth portion at an upper portion thereof and a gas supply section for supplying an inert gas, and by supplying the inert gas from the laser welding jig to a welding point between the prismatic battery outer can and a sealing cover that is fitted to the mouth portion of the prismatic battery outer can,
   the laser welding jig having the securing section provided with a slit-shaped blower outlet at a position below the welding point,
   the inert gas being supplied from the gas supply section to the slit-shaped blower outlet, and
   the inert gas being blown from the slit-shaped blower outlet upward to the welding point from below along the side surfaces of the prismatic battery outer can to carry out the laser welding.

2. The method for manufacturing a prismatic battery according to claim 1, wherein the jig being used as the laser welding jig is formed with the width of the slit-shaped blower outlet being larger than the widths of the prismatic battery outer can and the sealing cover that are the welding point.

3. The method for manufacturing a prismatic battery according to claim 1, wherein the jig being used as the laser welding jig is provided with the slit-shaped blower outlet having a top plate being positioned at approximately the same plane as the welding point and the other portions of the slit-shaped blower outlet being positioned below the welding point.

4. The method for manufacturing a prismatic battery according to claim 1, wherein the jig being used as the laser welding jig is provided with the securing section having a pair of clasping members for clasping and securing the prismatic battery outer can and each of the pair of clasping members being formed with the slit-shaped blower outlet.

5. The method for manufacturing a prismatic battery according to claim 4, wherein the jig being used as the laser welding jig is provided with the clasping member having a gas supplying inlet communicating with the slit-shaped blower outlet and the gas supplying inlet being coupled with the gas supply section.

6. The method for manufacturing a prismatic battery according to claim 1, wherein the jig being used as the laser welding jig is arranged with the securing section having a housing provided inside with a room of a predetermined shape, the slit-shaped blower outlet being formed at an exit of the room and a gas inlet being formed at an entrance of the room, and a shape and a size of a cross-section of the room parallel to the slit-shaped blower outlet of the room being varied progressively from the entrance to the exit of the room making the gas supplied from the gas inlet to be blown out from the slit-shaped blower outlet being diffused, flow regulated and accelerated.

7. The method for manufacturing a prismatic battery according to claim 6, wherein the jig being used as the laser welding jig is provided with the room from the entrance towards the exit thereof having:
   a diffusion chamber with lengths of a cross section thereof parallel to the slit-shaped blower outlet being progressively larger in both directions parallel to and intersecting at right angles with an extending direction of the slit-shaped blower outlet,
   a flow regulating chamber continuing from the diffusion chamber with a shape of the cross section thereof parallel to the slit-shaped blower outlet being maintained constant, and
   an acceleration chamber continuing from the flow regulating chamber with the length of the cross section thereof parallel to the slit-shaped blower outlet in the direction parallel to the extending direction of the slit-shaped blower outlet being maintained constant and the length of the cross section thereof parallel to the slit-shaped blower outlet in the direction intersecting at right angles with the extending direction of the slit-shaped blower outlet being progressively smaller,
   an exit of the acceleration chamber being the slit-shaped blower outlet.

8. The method for manufacturing a prismatic battery according to claim 7, wherein the jig being used as the laser welding jig is arranged with the diffusion chamber, the flow regulating chamber, and the acceleration chamber being in a single line in the room of the housing.

9. The method for manufacturing a prismatic battery according to claim 6, wherein the jig being used as the laser welding jig is provided with the securing section having a pair of housings provided inside with the room of the predetermined shape and each of the pair of housings being provided with a clasping member for clasping and securing the prismatic battery outer can, and the laser welding is carried out while the prismatic battery outer can being secured between the clasping members formed in each of the pair of housings.

10. The method for manufacturing a prismatic battery according to claim 1, wherein the jig being used as the laser welding jig controls the flow rate of the inert gas blown from the slit-shaped blower outlet positioned far from the welding point to be smaller than the flow rate of the inert gas blown from the slit-shaped blower outlet positioned close to the welding point.

11. The method for manufacturing a prismatic battery according to claim 1, wherein the jig being used as the laser welding jig is provided with an exhaust outlet formed at an upper position of the securing section along the slit-shaped blower outlet in planar view and exhaust means, the exhaust outlet being coupled with the exhaust means, and the exhaust means controlling the suction rate of the exhaust outlet positioned far from the welding point to be larger than the suction rate of the exhaust outlet positioned close to the welding point.

12. The method for manufacturing a prismatic battery according to claim 1, wherein the securing section of the laser welding jig has a room communicating with the slit-shaped blower outlet, the room being extending orthogonal to the side surfaces of the prismatic battery.

13. The method for manufacturing a prismatic battery according to claim 1, wherein the slit-shaped blower outlet is facing toward the side surfaces of the prismatic battery outer can.

14. The method for manufacturing a prismatic battery according to claim 1, wherein the laser welding jig has an upper surface, the upper surface being positioned higher than the upper portion of the prismatic battery outer can.

15. A laser welding jig for manufacturing a prismatic battery, the jig comprising:
a securing section for securing a prismatic battery outer can having side surfaces and a mouth portion at an upper portion thereof; and
a gas supply section for supplying an inert gas, the inert gas being supplied to a welding point between the prismatic battery outer can and a sealing cover that is fitted to the mouth portion of the prismatic battery outer can,
the securing section being provided with a slit-shaped blower outlet facing toward the side surfaces of the prismatic battery outer can at a position below the welding point,
the gas supply section supplying the inert gas to the slit-shaped blower outlet, and
the slit-shaped blower outlet blowing the inert gas upward to the welding point from below along the side surfaces of the prismatic battery outer can to carry out laser welding.

16. A method for manufacturing a prismatic battery, the method comprising:
laser welding by using a laser welding jig provided with a securing section for securing a prismatic battery outer can having side surfaces and a mouth portion at an upper portion thereof and a gas supply section for supplying an inert gas, and by supplying the inert gas from the laser welding jig to a welding point between the prismatic battery outer can and a sealing cover that is fitted to the mouth portion of the prismatic battery outer can,
the laser welding jig having the securing section provided with a slit-shaped blower outlet at a position below the welding point,
the inert gas being supplied from the gas supply section to the slit-shaped blower outlet, and
the inert gas being blown from the slit-shaped blower outlet toward the side surfaces of the prismatic battery outer can to carry out the laser welding.

17. The method for manufacturing a prismatic battery according to claim 16, wherein at least one of portions of the slit-shaped blower outlet is positioned below the welding point.

18. The method for manufacturing a prismatic battery according to claim 17, wherein the slit-shaped blower outlet is facing toward the side surfaces of the prismatic battery outer can.

19. The method for manufacturing a prismatic battery according to claim 18, wherein the securing section of the laser welding jig has a room communicating with the slit-shaped blower outlet, the room being extending orthogonal to the side surfaces of the prismatic battery.

* * * * *